United States Patent
Lee

(10) Patent No.: US 7,617,895 B2
(45) Date of Patent: Nov. 17, 2009

(54) METHOD OF DETERMINATION OF DRIVING MODE OF HYBRID VEHICLE

(75) Inventor: Se-Yong Lee, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 796 days.

(21) Appl. No.: 11/299,388

(22) Filed: Dec. 8, 2005

(65) Prior Publication Data
US 2007/0112484 A1  May 17, 2007

(30) Foreign Application Priority Data
Nov. 15, 2005  (KR) .................... 10-2005-0109125

(51) Int. Cl.
*B60W 20/00* (2006.01)
(52) U.S. Cl. .............. 180/65.265; 180/65.29
(58) Field of Classification Search ........... 180/65.265, 180/65.275, 65.28, 65.285, 65.29; 701/22
See application file for complete search history.

(56) References Cited

U.S. PATENT DOCUMENTS

| 5,713,814 A * | 2/1998 | Hara et al. ............... 477/5 |
| 6,098,592 A * | 8/2000 | Hess et al. ............... 123/350 |
| 6,662,096 B2 * | 12/2003 | Komiyama et al. ....... 701/54 |
| 6,809,429 B1 * | 10/2004 | Frank ..................... 290/40 C |
| 7,070,530 B2 * | 7/2006 | Ai et al. .................. 475/5 |
| 2001/0039230 A1 * | 11/2001 | Severinsky et al. ...... 477/3 |
| 2002/0065165 A1 * | 5/2002 | Lasson et al. ............ 477/3 |
| 2004/0055799 A1 * | 3/2004 | Atarashi et al. .......... 180/65.2 |
| 2004/0254047 A1 * | 12/2004 | Frank et al. ............. 477/37 |
| 2005/0257968 A1 * | 11/2005 | Egami ..................... 180/65.2 |
| 2006/0111212 A9 * | 5/2006 | Ai et al. .................. 475/5 |
| 2008/0105477 A1 * | 5/2008 | Abe ........................ 180/65.2 |

* cited by examiner

*Primary Examiner*—S. Joseph Morano
*Assistant Examiner*—Vaughn T Coolman
(74) *Attorney, Agent, or Firm*—Morgan, Lewis & Bockius LLP

(57) ABSTRACT

The present invention provides a method of determination of the driving mode of a hybrid vehicle. The method is executed by a hybrid control unit (HCU) and includes the step of modeling a PNGV (Partnership for a New Generation of Vehicles) systems analysis toolkit (PSAT) to calculate power reserved to drive a motor. Thereafter, whether or not the driving mode of the hybrid vehicle is consistent with an electric vehicle (EV) mode is determined using the power reserved to drive the motor, which has been calculated using the PSAT model. If the driving mode is not consistent with the EV mode, whether or not the driving mode is consistent with a maximum (MAX) torque mode is determined. If the driving mode is not consistent with the MAX torque mode, the driving mode is determined to be a hybrid-electric vehicle (HEV) mode.

8 Claims, 5 Drawing Sheets

METHOD OF DETERMINATION OF DRIVING MODE OF HYBRID VEHICLE

CROSS-REFERENCE TO RELATED APPLICATIONS

The present application is based on, and claims priority from, Korean Application Serial Number 10-2005-0109125, filed on Nov. 15, 2005, the disclosure of which is hereby incorporated by reference herein in its entirety.

FIELD OF THE INVENTION

The present invention relates to methods for the determination of driving modes of hybrid vehicles and, more particularly, to a method of the determination of the driving mode of a hybrid vehicle, which models a PNGV (the Partnership for a New Generation of Vehicles) systems analysis toolkit (PSAT) and determines, using the PSAT model, which mode, among a hybrid-electric vehicle (HEV) mode, an electric vehicle (EV) mode, and a maximum (MAX) torque mode, is consistent with the present driving mode of the hybrid vehicle.

BACKGROUND OF THE INVENTION

Generally, a hybrid control unit (HCU) of a hybrid vehicle controls the operation of an engine, a generator and a motor of the hybrid vehicle and causes the hybrid vehicle to be driven in an optimal state. In other words, the HCU controls the hybrid vehicle such that the vehicle can be driven in an appropriate driving mode, selected between a HEV mode, an EV mode and a MAX torque mode according to both a required torque and the state of charge (SOC) of a battery. As well known to those skilled in the art, the HEV mode is a driving mode in which the HCU drives the hybrid vehicle using both the engine and the motor. In the EV mode, the hybrid vehicle is driven using only the motor and power of the battery. In the MAX torque mode, the hybrid vehicle is driven both by the engine and by the motor such that, if the required torque in the MAX torque mode is not provided by the HEV mode, the engine is operated in the maximum torque mode and the remaining part of the required torque is provided by the motor. Furthermore, the hybrid vehicle may be driven in a regeneration mode, wherein the battery is charged with electricity while braking force is applied to the vehicle.

In the prior art, the HCU selects an appropriate driving mode for the hybrid vehicle using a control algorithm stored therein. However, an error may occur while the HCU selects an appropriate driving mode for the hybrid vehicle. Furthermore, the conventional HCU does not have any means for detecting the occurrence of error or of informing a driver of the vehicle of the error, so that the conventional HCU may fail to maintain an optimal driving state of the hybrid vehicle.

Thus, the inventor of the present invention has actively studied monitoring logic that can be used by the HCU to determine which mode is consistent with the present driving mode of a hybrid vehicle.

SUMMARY OF THE INVENTION

Embodiments of the present invention improve the reliability of the operation of a hybrid control unit (HCU) that controls the driving mode of a hybrid vehicle through modeling a PNGV systems analysis toolkit (PSAT) and determining which mode is consistent with a present driving mode of the hybrid vehicle using the PSAT model.

A method of determination of the driving mode of a hybrid vehicle, which is executed by an HCU, includes the step of modeling a PSAT to calculate the power reserved for driving a motor. Thereafter, whether or not the driving mode of the hybrid vehicle is consistent with an electric vehicle (EV) mode is determined using the power reserved to drive the motor, which has been calculated using the PSAT model. If the driving mode is not consistent with the EV mode, whether the driving mode is consistent with a maximum (MAX) torque mode or not is determined. If the driving mode is not consistent with the MAX torque mode, it is determined that the driving mode is a hybrid-electric vehicle (HEV) mode.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

A method of determination of the driving mode of a hybrid vehicle according to an embodiment of the present invention will be described herein below with reference to FIG. 1, which is a flowchart of the driving mode determination method.

Figure 1:
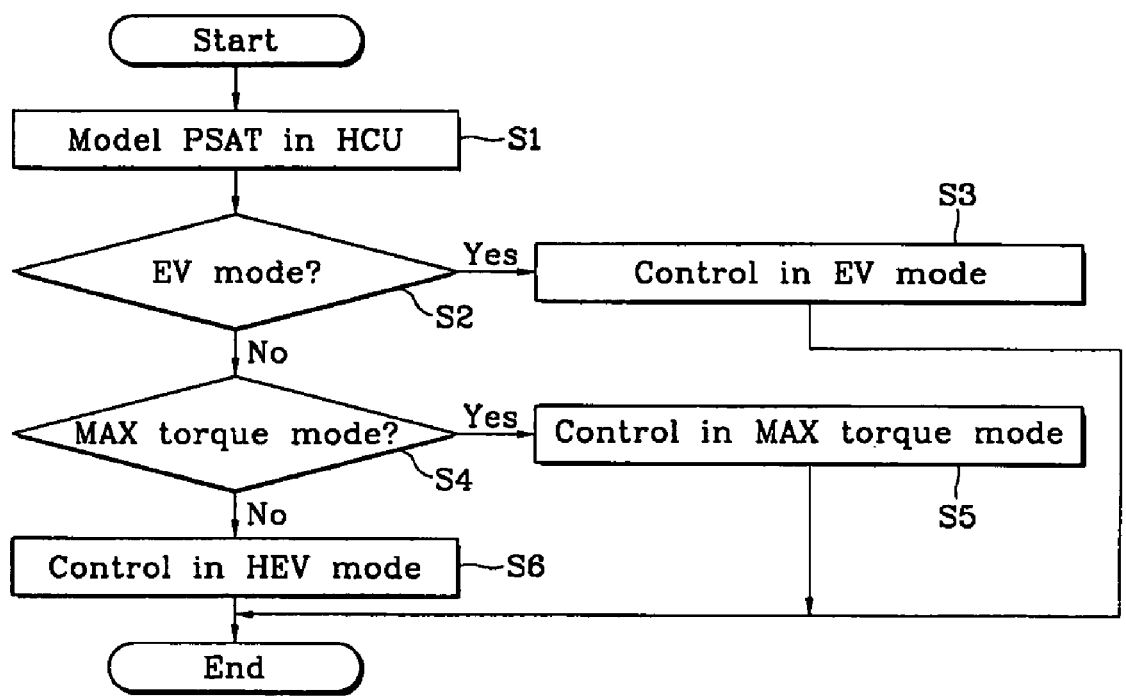
FIG. 1 is a flowchart of a method of determination of the driving mode of a hybrid vehicle according to an embodiment of the present invention.

As shown in FIG. 1, to determine the driving mode of a hybrid vehicle, at step S1, the hybrid control unit (HCU) of a hybrid vehicle models a PNGV (the Partnership for a New Generation of Vehicles) systems analysis toolkit (PSAT) to calculate the power reserved to drive a motor.

Thereafter, at step S2, the HCU determines whether the driving mode of the hybrid vehicle is consistent with an electric vehicle (EV) mode or not, using the PSAT modeled at step S1. If it is determined that the driving mode of the hybrid vehicle is consistent with the EV mode, the HCU sets, at step S3, the driving mode of the vehicle to the EV mode and controls the vehicle in the EV mode. However, if the driving mode of the hybrid vehicle is not consistent with the EV mode, the HCU determines at step S4 whether the driving mode of the hybrid vehicle is consistent with a maximum (MAX) torque mode or not. If it is determined that the driving mode of the hybrid vehicle is consistent with the MAX torque mode, the HCU sets, at step S5, the driving mode of the vehicle to the MAX torque mode and controls the vehicle in the MAX torque mode. However, if the driving mode of the hybrid vehicle is not consistent with the MAX torque mode, the HCU sets, at step S6, the driving mode of the vehicle to a hybrid-electric vehicle (HEV) mode and controls the vehicle in the HEV mode. The step of determining whether the driving mode is consistent with the EV mode and the step of determining whether the driving mode is consistent with the MAX torque mode will be described in detail later herein.

Figure 2A:
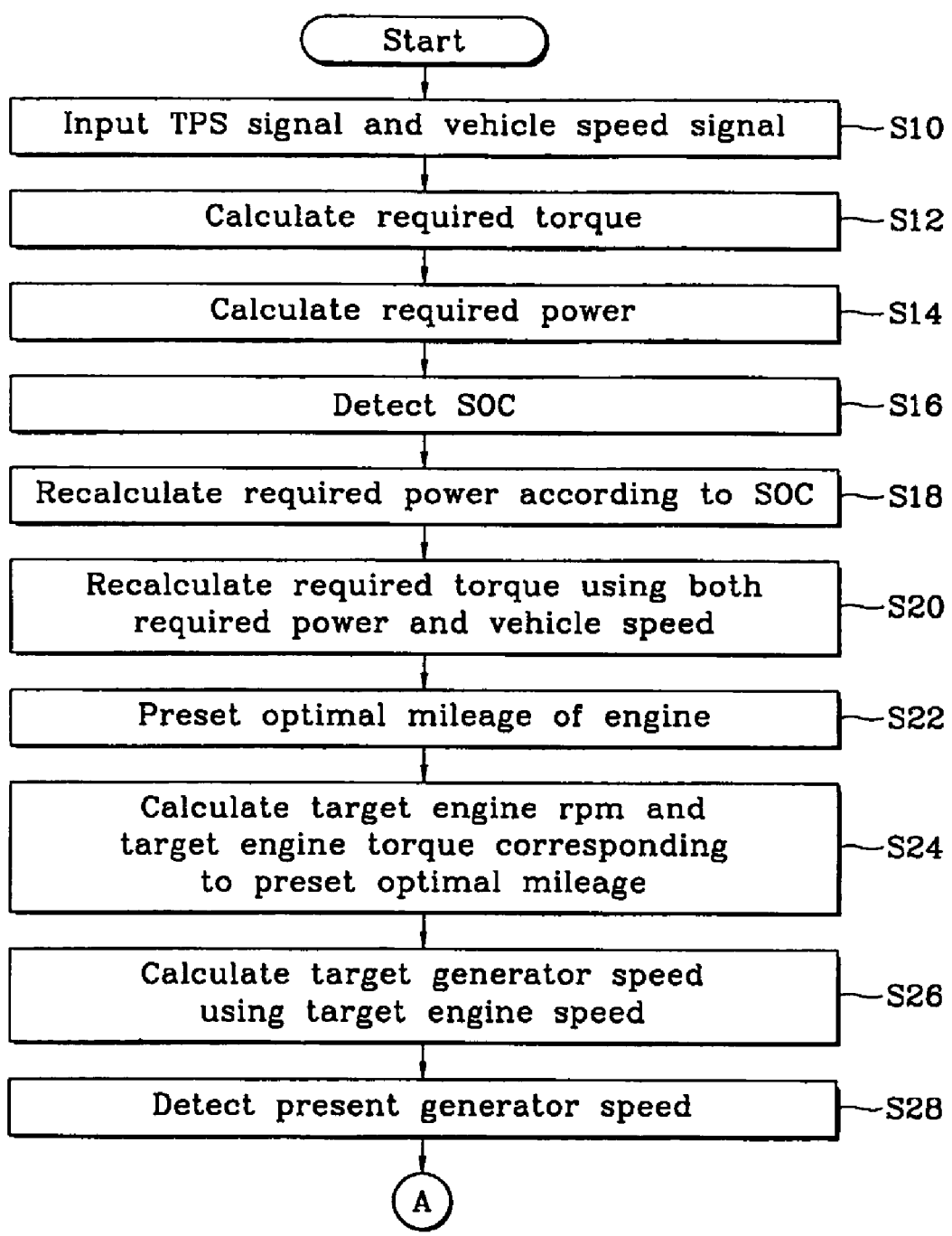
FIGS. 2a and 2b are flowcharts of the process of calculating power reserved to determine the driving mode of the hybrid vehicle according to the present invention.
Figure 2B:
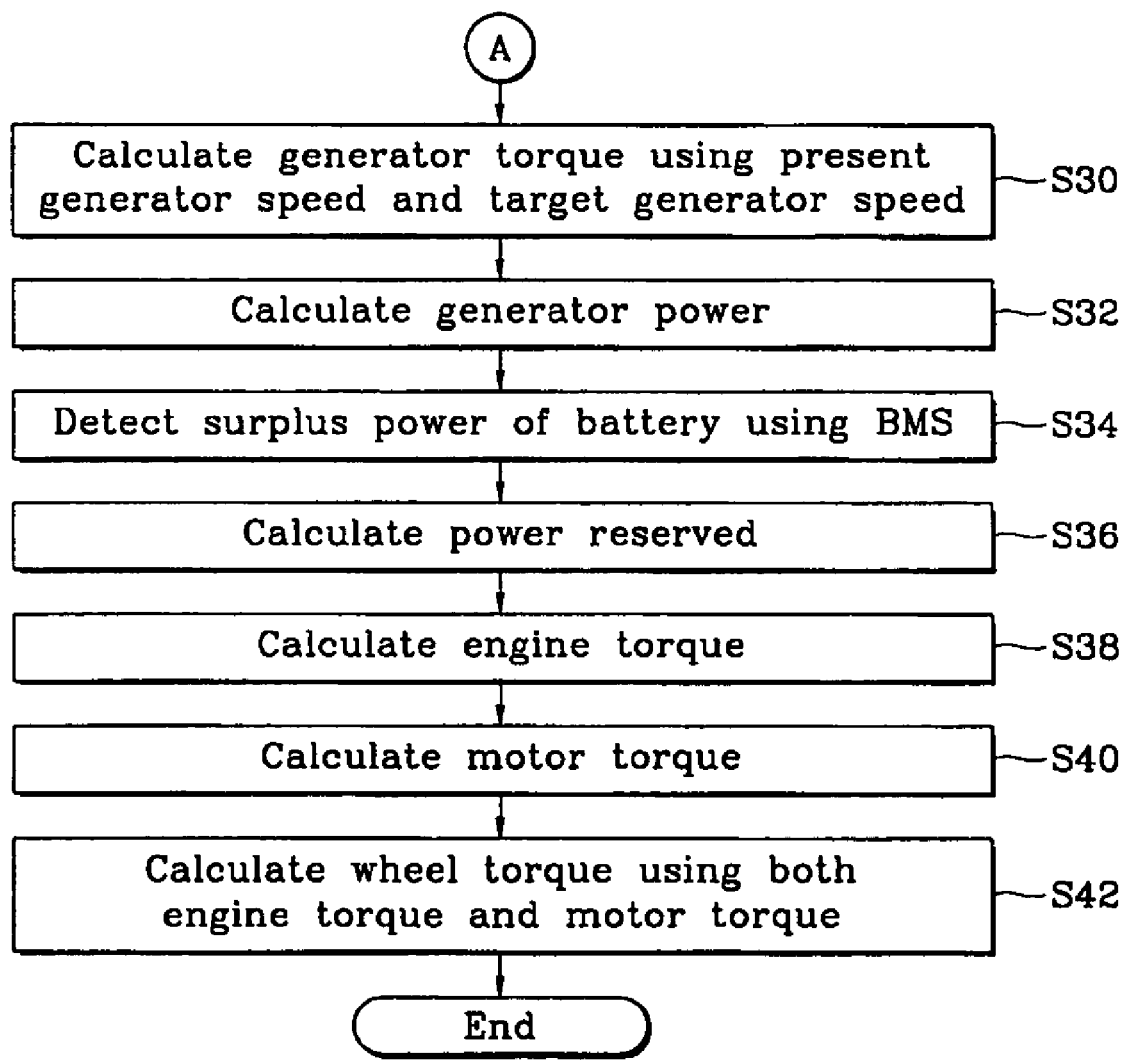

In the above-mentioned process, the PSAT to calculate power reserved to drive the motor is modeled as illustrated in the flowchart of FIGS. 2a and 2b.

As illustrated in FIGS. 2a and 2b, to model the PSAT according to the embodiment of the present invention, both a throttle position sensor (TPS) signal and a vehicle speed signal are input at step S10.

Thereafter, at step S12, the HCU calculates a required torque using both the TPS signal and the vehicle speed signal and, at step S14, converts the calculated required torque into required power.

Thereafter, the HCU detects the state of charge (SOC) of a battery at step S16, and recalculates the required power of an engine according to the SOC of the battery at step S18.

At step S20, the HCU recalculates the required torque using both the recalculated required power of step S18 and a vehicle speed and, at step S22, presets an optimal mileage (operating point) of the engine corresponding both to the recalculated required torque and to the vehicle speed.

After presetting the operating point of the engine at step S22, the HCU calculates, at step S24, both a target engine rpm and a target engine torque corresponding to the preset operating point of the engine, and calculates, at step S26, a target generator speed using the target engine rpm.

Thereafter, the HCU detects, at step S28, a present generator speed, calculates, at step S30, a generator torque using both the present generator speed and the target generator speed, and calculates, at step S32, consumed generator power using the generator torque.

After calculating the consumed generator power at step S32, the HCU detects surplus power of the battery using a battery management system (BMS) at step S34, and calculates the power reserved to drive the motor using both the surplus power of the battery and the generator power at step S36. In the present invention, the power reserved is calculated using the following Expression 1.

Power reserved=surplus power of battery−generator power [Expression 1]

Returning to the flowchart, after calculating the power reserved at step S36, the HCU calculates engine torque at step S38, motor torque at step S40, and wheel torque at step S42 using both the engine torque and the motor torque.

The process of determining, using the above-mentioned PSAT model, whether the driving mode of the hybrid vehicle is consistent with the EV mode will be described herein below with reference to the flowchart of FIG. 3.

Figure 3:
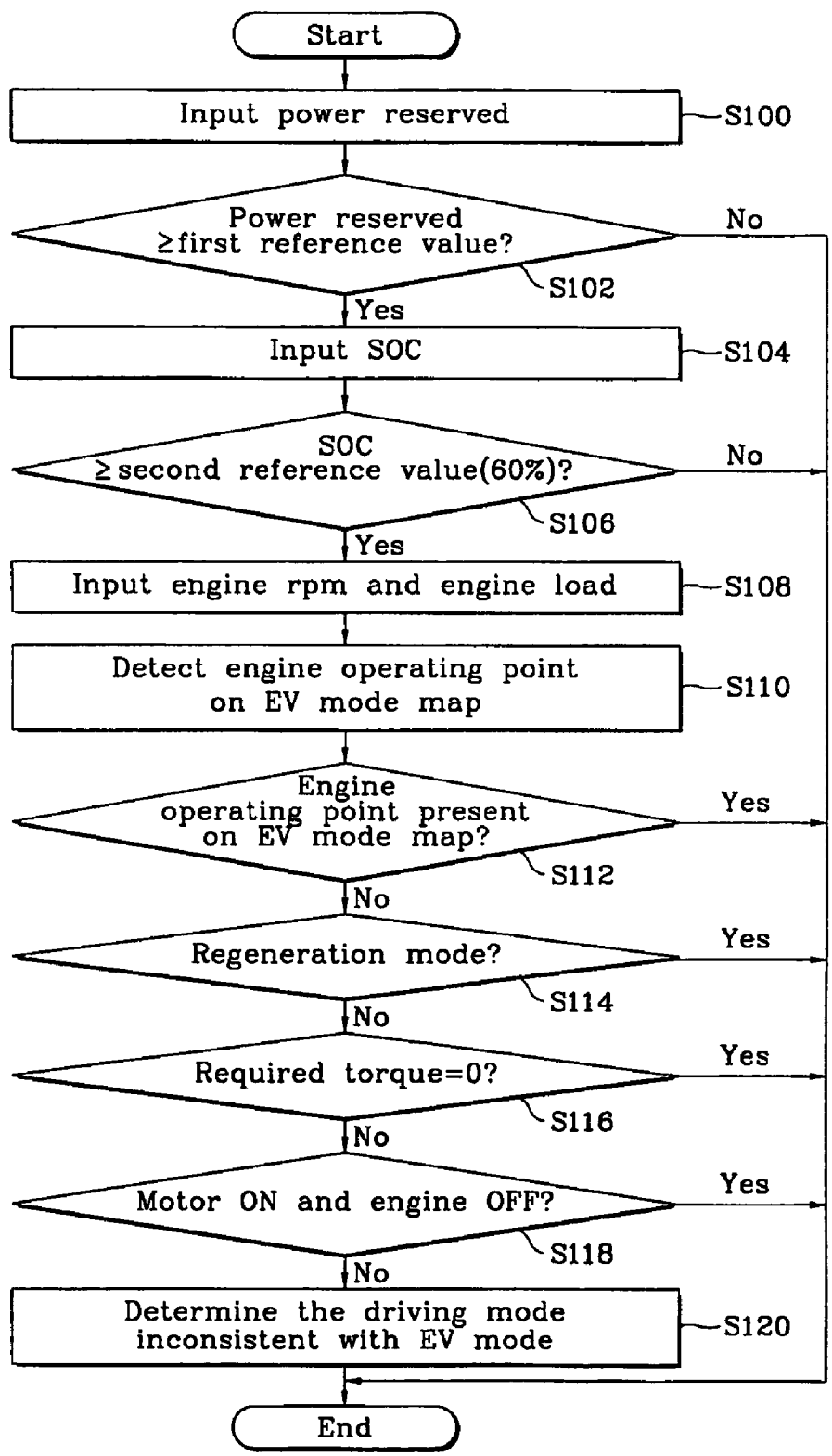
FIG. 3 is a flowchart of the process of determining whether the driving mode is consistent with an EV mode according to the present invention.

As illustrated in FIG. 3, to determine whether the driving mode of the hybrid vehicle is consistent with the EV mode, first, the reserved power, calculated using the PSAT model is input at step S100.

Thereafter, the HCU determines, at step S102, whether the reserved input power of step S100 is not lower than a preset first reference value, which is set to 50% of a total discharge amount of the battery in the embodiment of the present invention. If the input power reserved is not lower than the preset first reference value, the SOC value of the battery is input at step S104.

Thereafter, the HCU determines, at step S106, whether the SOC value of the battery input at step S104 is not lower-than a preset second reference value, which is set to 60% of the SOC value of the battery in the embodiment of the present invention. If the SOC value of the battery is not lower than the preset second reference value, both the present engine rpm and the present engine load are input at step S108. Upon receiving both the present engine rpm and the present engine load, the HCU detects, at step S110, the operating point of the engine on an EV mode map and determines, at step S112, whether the operating point of the engine is present on the EV mode map.

When it is determined, at step S112, that the operating point of the engine is present on the EV mode map, the HCU sets the driving mode of the hybrid vehicle to the EV mode and controls the vehicle in the EV mode. However, if the operating point of the engine is not present on the EV mode map, the HCU determines, at step S114, whether the driving mode of the vehicle is consistent with a regeneration mode to charge the battery with electricity using braking force. If the driving mode is not consistent with the regeneration mode, the HCU determines, at step S116, whether the required torque is zero.

When it is determined, at step S116, that the required torque is not zero, the HCU determines, at step S118, whether the motor is in an ON state and the engine is in an OFF state. When the engine is in the OFF state and the motor is not in the ON state, the HCU determines, at step S120, that the driving mode of the vehicle is not consistent with the EV mode.

Figure 4:
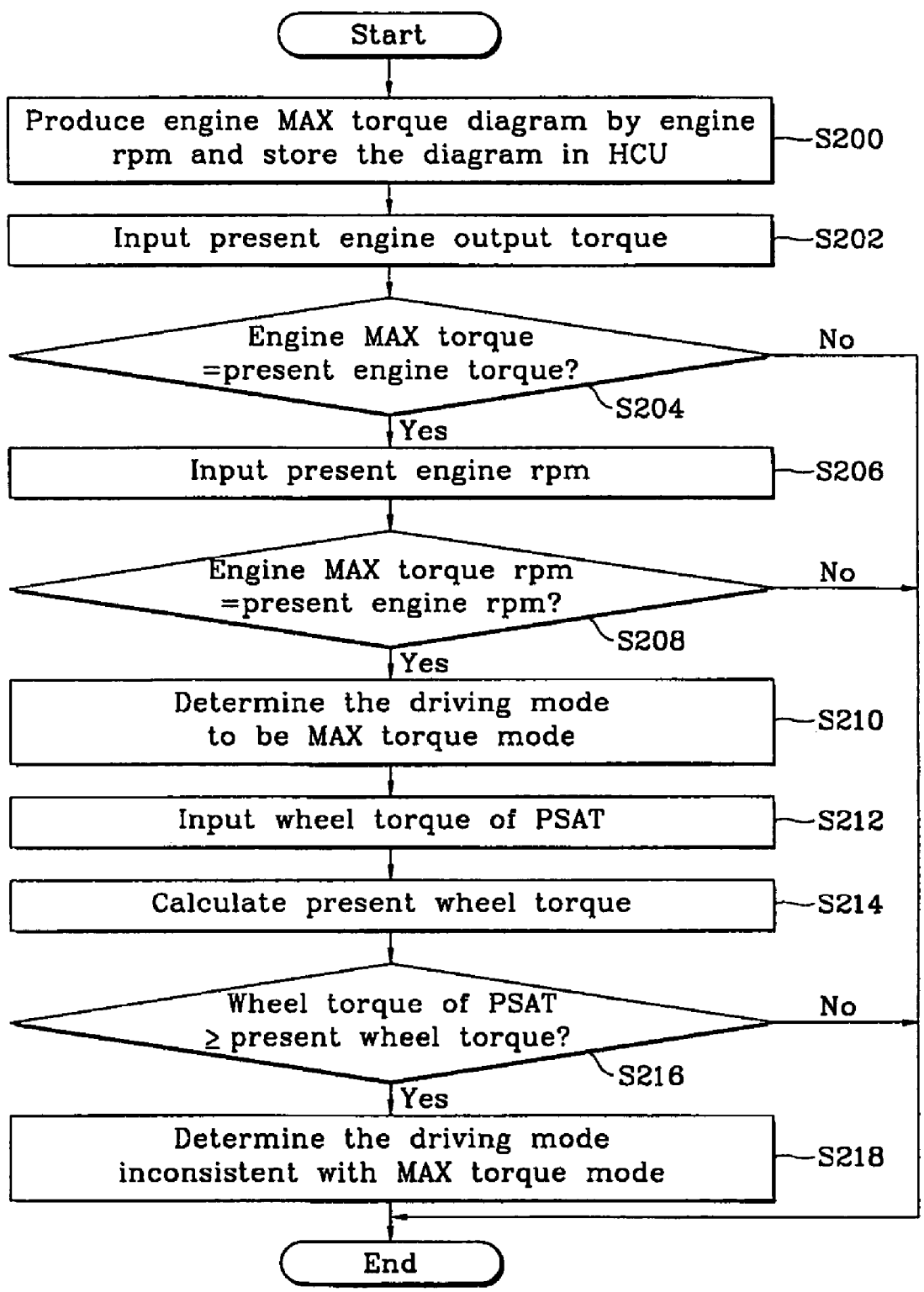
FIG. 4 is a flowchart of the process of determining whether the driving mode is consistent with a MAX torque mode according to the present invention.

When it is determined, in the process of FIG. 3, that the driving mode of the vehicle is not consistent with the EV mode, the HCU determines whether the driving mode is consistent with the MAX torque mode or not, as illustrated in the flowchart of FIG. 4.

As shown in FIG. 4, first, an engine MAX torque diagram is produced using engine rpm and is stored in the HCU, at step S200.

After producing and storing the engine MAX torque diagram in the HCU at step S200, a present engine output torque is input at step S202. Upon receiving the present engine output torque, the HCU compares the present engine output torque to the engine MAX torque of the diagram at step S204.

When it is determined, at step S204, that the present engine output torque is equal to the engine MAX torque (in the embodiment of the present invention, an allowable error of ±5 Nm is recommended), a present engine rpm is input at step S206. Upon receiving the present engine rpm, the HCU compares the present engine rpm to an engine MAX torque rpm, at step S208.

When it is determined, at step S208, that the present engine rpm is equal to the engine MAX torque rpm (in the embodiment of the present invention, an allowable error of ±100 rpm is recommended), the HCU determines, at step S210, that the driving mode of the vehicle is consistent with the MAX torque mode.

After it is determined, at step S210, that the driving mode of the vehicle is consistent with the MAX torque mode, the wheel torque, which has been calculated using the PSAT model in the process of FIGS. 2a and 2b and can be used to determine whether the driving mode is in a normal state or an abnormal state, is input at step S212. Upon receiving the wheel torque of the PSAT model, the HCU calculates, at step S214, a present wheel torque, and compares, at step S216, the present wheel torque with the wheel torque of the PSAT model.

When it is determined, at step S216, that the wheel torque of the PSAT model is not lower than the present wheel torque, the HCU determines, at step S218, that the driving mode of the vehicle is not consistent with the MAX torque mode.

Furthermore, when it is determined, in the processes of FIGS. 3 and 4, that the driving mode of the hybrid vehicle is not consistent with the EV mode or the MAX torque mode, the HCU determines that the driving mode is consistent with HEV mode, wherein the hybrid vehicle is driven both by the engine and by the motor. Thus, in the above state, the HCU sets the driving mode of the hybrid vehicle to the HEV mode and controls the vehicle in the HEV mode.

As apparent from the above description, the HCU according to the present invention models a PSAT to determine the present driving mode of a hybrid vehicle and determines which mode is consistent with the present driving mode of the hybrid vehicle using the PSAT model.

Although a preferred embodiment of the present invention has been described for illustrative purposes, those skilled in the art will appreciate that various modifications, additions and substitutions are possible, without departing from the scope and spirit of the invention as disclosed in the accompanying claims.

According to the method of determination of the driving mode of a hybrid vehicle according to the present invention, the HCU determines which mode is consistent with the present driving mode of the hybrid vehicle while the vehicle is driven, so that the HCU can precisely control the driving mode of the hybrid vehicle and maintain an optimal driving state of the hybrid vehicle.

What is claimed is:

1. A method of determination of a driving mode of a hybrid vehicle, the method being executed by a hybrid control unit (HCU) and comprising the steps of:
    modeling a PNGV (Partnership for a New Generation of Vehicles) systems analysis toolkit (PSAT) to calculate reserved power to drive a motor;
    determining whether the driving mode of the hybrid vehicle is consistent with an electric vehicle (LV) mode or not, using the power reserved to drive the motor, which has been calculated using the PSAT model;
    if the driving mode is not consistent with the EV mode, determining whether or not the driving mode is consistent with a maximum (MAX) torque mode; and
    if the driving mode is not consistent with the MAX torque mode, determining that driving mode to be a hybrid-electric vehicle (HEV) mode; and
    wherein said step of determining whether the driving mode is consistent with the MAX torque mode comprises the steps of:
        producing an engine MAX torque diagram using engine rpm and storing the engine MAX torque diagram in the HCU;
        inputting a present engine output torque;
        comparing the present engine output torque to the engine MAX torque of the diagram;
        if the present engine output torque is equal to the engine MAX torque, inputting a present engine rpm;
        comparing the present engine rpm to an engine MAX torque rpm;
        if the present engine rpm is equal to the engine MAX torque rpm, determining that the driving mode is consistent with the MAX torque mode;
        inputting a wheel torque calculated using the PSAT model;
        calculating a present wheel torque; and
        if the wheel torque calculated using the PSAT model is not lower than the present wheel torque, determining that the driving mode is not consistent with the MAX torque mode.

2. The method as defined in claim 1, wherein, when the present engine output torque is compared to the engine MAX torque, an allowable error of ±5 Nm is recommended.

3. The method as defined in claim 1, wherein, when the present engine rpm is compared to the engine MAX torque rpm, an allowable error of ±100 rpm is recommended.

4. A method of determination of a driving mode of a hybrid vehicle, the method being executed by a hybrid control unit (HCU) and comprising the steps of:
    modeling a PNGV (Partnership for a New Generation of Vehicles) systems analysis toolkit (PSAT) to calculate reserved power to drive a motor;
    determining whether the driving mode of the hybrid vehicle is consistent with an electric vehicle (EV) mode or not, using the power reserved to drive the motor, which has been calculated using the PSAT model;
    if the driving mode is not consistent with the EV mode, determining whether or not the driving mode is consistent with a maximum (MAX) torque mode; and
    if the driving mode is not consistent with the MAX torque mode, determining that driving mode to be a hybrid-electric vehicle (HEV) mode; and
    wherein said step of determining whether the driving mode is consistent with the EV mode comprises the steps of:
        inputting the power-reserved;
        determining whether the input reserved power is not lower than a preset first reference value;
        if the input reserved power is not lower than the preset first reference value, inputting the state of charge (SOC) of the battery;
        determining whether the SOC value of the battery is not lower than a preset second reference value;
        if the SOC value of the battery is not lower than the preset second reference value, inputting both a present engine rpm and a present engine load;
        detecting an operating point of both the present engine rpm and the present engine load on an EV mode map;
        determining whether the operating point of both the present engine rpm and the present engine load is present on the EV mode map;
        if the operating point of both the present engine rpm and the present engine load is not present on the EV mode map, determining whether the driving mode is consistent with a regeneration mode;
        if the driving mode is not consistent with the regeneration mode, determining whether a required torque is zero;
        if the required torque is not zero, determining whether the motor is in an ON state and an engine is in an OFF state; and
        if the engine is in the OFF state and the motor is not in the ON state, determining that the driving mode is not consistent with the EV mode.

5. The method as defined in claim 4, wherein said first reference value is set to 50% of a total discharge amount of the battery.

6. The method as defined in claim 4, wherein said second reference value is set to 60% of the SOC value of the battery.

7. The method as defined in claim 4, wherein said step of modeling the PSAT comprises the steps of:
    inputting both a throttle position sensor (TPS) signal and a vehicle speed signal;
    calculating a required torque and required power;
    detecting the state of charge (SOC) of a battery;
    recalculating the required power according to the SOC of the battery;
    recalculating the required torque using both the recalculated required power and a vehicle speed;
    presetting an optimal mileage of an engine corresponding both to the recalculated required torque and to the vehicle speed;

calculating both a target engine rpm and a target engine torque corresponding to the preset optimal mileage of the engine;
calculating a target generator speed using the target engine rpm;
detecting a present generator speed;
calculating both a generator torque and generator power using both the present generator speed and the target generator speed;
detecting surplus power of the battery using a battery management system (BMS);
calculating the reserved power using both the surplus power of the battery and the generator power; and
calculating an engine torque, a motor torque and a wheel torque using the calculated reserved power.

8. The method as defined in claim 7, wherein said reserved power is calculated using the following expression Reserved power=surplus power of battery−generator power.

* * * * *